United States Patent [19]
Ono et al.

[11] Patent Number: 5,418,710
[45] Date of Patent: May 23, 1995

[54] SIMULATOR USING A NEURAL NETWORK

[75] Inventors: Kazuteru Ono; Tadahiro Yanagisawa, both of Tokyo, Japan

[73] Assignee: Kabushiki Kaisha Toshiba, Kanagawa, Japan

[21] Appl. No.: 948,434

[22] Filed: Sep. 22, 1992

[30] Foreign Application Priority Data

Oct. 31, 1991 [JP] Japan .................. 3-286804

[51] Int. Cl.$^6$ .............................. G05B 13/04
[52] U.S. Cl. .................... 364/149; 364/578
[58] Field of Search ............ 364/131, 149, 578; 395/21, 23, 904

[56] References Cited

U.S. PATENT DOCUMENTS

| | | | |
|---|---|---|---|
| 4,858,147 | 8/1989 | Conwell | 364/148 |
| 4,874,963 | 10/1989 | Alspector | 395/24 |
| 4,943,931 | 7/1990 | Allen | 395/27 |
| 5,004,932 | 4/1991 | Nejime | 395/24 |
| 5,016,204 | 5/1991 | Simoudis et al. | 364/578 |
| 5,056,037 | 10/1991 | Eberhardt | 395/24 |
| 5,063,492 | 11/1991 | Yoda et al. | 364/167.01 |
| 5,142,612 | 8/1992 | Skeirik | 395/11 |
| 5,161,110 | 11/1992 | Dorchak | 364/468 |
| 5,349,541 | 9/1994 | Alexandro, Jr. et al. | 364/578 |

FOREIGN PATENT DOCUMENTS

0432267A1  6/1991  European Pat. Off. .

OTHER PUBLICATIONS

Patent Abstracts of Japan, vol. 15, No. 131 (P-1186) (4659) Mar. 29, 1991.
Moorthy et al., "Neural Network Simulation for Plant Control Optimization," Proceedings of the Industrial Computing Conference, vol. 1, pp. 307-316, Oct. 27-31, 1991.

Primary Examiner—Paul P. Gordon
Attorney, Agent, or Firm—Finnegan, Henderson, Farabow, Garrett & Dunner

[57] ABSTRACT

A simulator includes a modelling simulate section in which properties of an apparatus to be controlled are modelled. In addition, this simulator includes a neural network in which learning is performed depending on a real control quantity for the apparatus to be controlled. A correction value relative to a simulation control quantity for the modeling simulate section is calculated in the neural network based on a process quantity output from a controlling unit. Thereafter, the simulation control quantity is corrected depending on the calculated correction value. In practice, learning is performed in the neural network by changing a synapse load based on a real quantity for the apparatus to be controlled. As a result of the foregoing correction, the simulator can simulate the real apparatus more accurately.

24 Claims, 16 Drawing Sheets

SIMULATOR USING A NEURAL NETWORK

BACKGROUND OF THE INVENTION

1. Field of the Invention

The present invention relates to a simulator for simulating an object to be controlled, such as a manufacturing plant or the like, and a controlling unit. More particularly, the present invention relates to a simulator for reproducing operations to be performed by a real object or machine at a higher accuracy.

2. Description of the Related Art

A simulator is used for simulating operations to be performed by a large-sized machine when it is designed and adjusted, when various kinds of processes are researched and tested, or when an operator is trained on dangerous or difficult machines.

To facilitate understanding of the present invention, a typical example of a conventional simulator will be described below with reference to FIG. 1, wherein it is assumed that the simulator is used for a water supply control process in a power station.

FIG. 1 is a block diagram of the conventional simulator for a water supply control process.

An output from a controlling unit 10 is input into a simulator 20. The controlling unit 10 is constructed of a comparing/calculating circuit 11 and a processing/calculating circuit 12. As is apparent from the drawing, a target value a of an object to be controlled and an output from the simulator 20 are input into the comparing-/calculating circuit 11. In response to the input signals, the comparing/calculating circuit 11 calculates a differential control signal f. This differential control signal f is specifically processed in the processing/calculating circuit 12, and thereafter, it is input into the simulator 20 in the form of a processed quantity g.

FIG. 2 is a block diagram that schematically shows the structure of the simulator 20, particularly illustrating a simulation of the same.

As shown in the drawing, the simulator 20 has processing delay characteristic 21, pump delay characteristic 22 and pump rotational speed vs discharge flow rate characteristic 23. A simulation control quantity d is calculated in the simulator 20 based on the process quantity g, and thereafter, it is output from the simulator 20.

When a modelled simulator as described above is used, an output signal from the controlling unit 10 is input to the simulator 20 in the form of a process quantity g. The controlling unit 10 operates to cause the simulation control quantity d fed back from the simulator 20 to coincide with the target value a. Each object to be controlled by the simulator 20 is modelled with respect to the processing delay characteristic 21, the pump delay characteristic 22 and the pump rotational speed vs. discharge flow rate characteristic 23. Thus, properties of the resultant model are previously determined before a real machine is designed.

In practice, however, the simulator 20 does not completely simulate the properties of the real machine. Thus, there often arises a malfunction that the properties of each model do not coincide with those of the real machine when water supply control is simulated with the aid of the controlling unit 10 and the simulator 20.

For example, when a plant is controlled, each actuator has not only delay but also back-lash. Moreover, there arises a problem that properties of the actuator in the opening direction differ from those in the closing direction. Further, since pump properties of the model do not completely coincide with those of the real machine, there arises another problem that a flow rate of supply water of the model differs from that of the real machine.

FIG. 3 is a graph which shows characteristic curves representing pump NQ characteristics, particularly illustrating a difference between designed values and practically measured values. In the drawing, a characteristic curve A represents designed values and a characteristic curve B represents practically measured values.

It is apparent from the drawing that the designed values of the pump NQ characteristics differ considerably from the practically measured values of the same. Due to the difference as mentioned above, the simulator 20 cannot completely simulate the real machine.

Thus, in an operation training simulator in which operations of a controlling unit are performed with the aid of a simulation circuit or a software that merely attempt to duplicate an operation panel of a model each operation training cannot be achieved correctly.

SUMMARY OF THE INVENTION

As mentioned above, conventional simulators use a model representing properties of a real machine and each simulating operation is performed with the simulator using the foregoing model. Thus, a malfunction often arises because the properties of the model do not coincide with those of the real machine.

The present invention has been made in consideration of the aforementioned background.

An object of the present invention is to provide a simulator that simulates operations of a real machine with high accuracy.

The present invention provides a simulator using a neural network wherein an output from a modelling simulate section for modelling properties of a real machine is corrected by the neural network. Learning is performed in the neural network based on a control quantity given from the real machine. Each learning is achieved in accordance with a learning algorithm such as a back-propagation algorithm or the like by correcting and fixing synapse loads of the neural network, in order to simulate the properties of the real machine at a higher accuracy.

DESCRIPTION OF THE PREFERRED EMBODIMENTS

The present invention will now be described below with reference to the accompanying drawings which illustrate preferred embodiments thereof.

Figure 1:
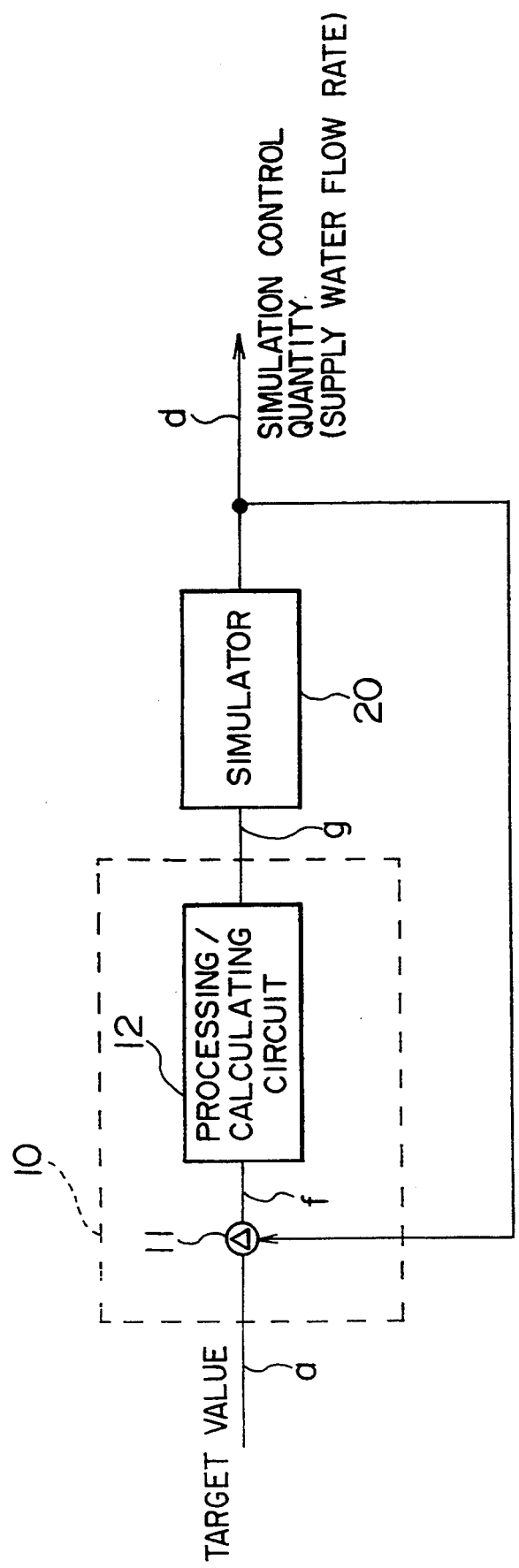
FIG. 1 is a block diagram of a conventional simulator which is used for a water supply control process.
Figure 2:
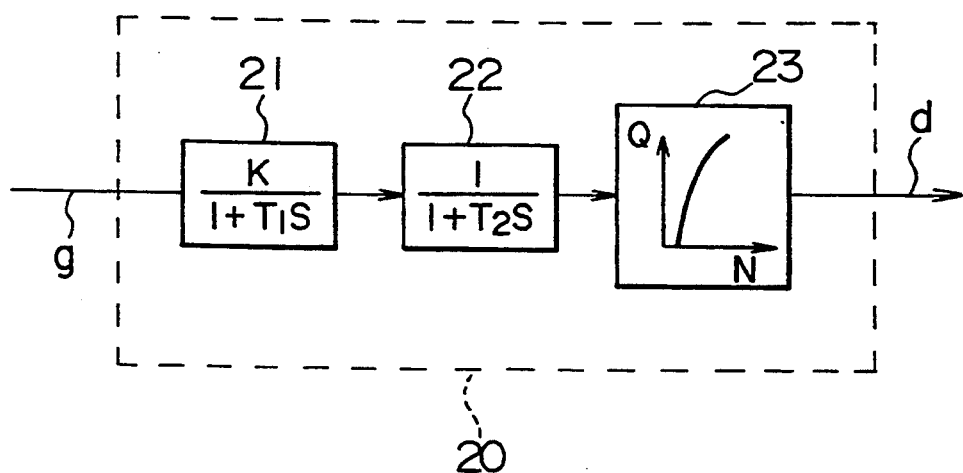
FIG. 2 is a block diagram which shows the properties of the conventional simulator.
Figure 3:
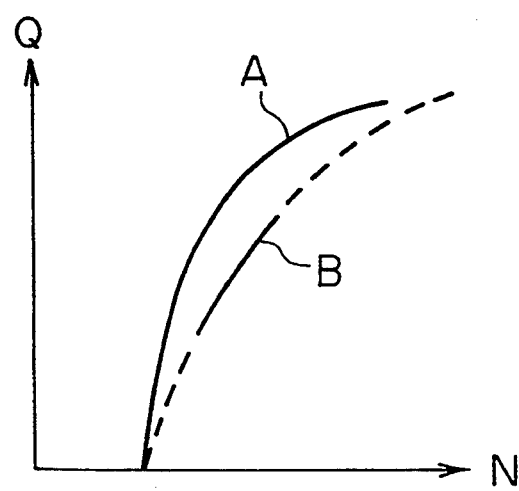
FIG. 3 is a graph which shows pump NQ characteristic diagrams, particularly illustrating a difference between designed values and actually measured values.
Figure 4:
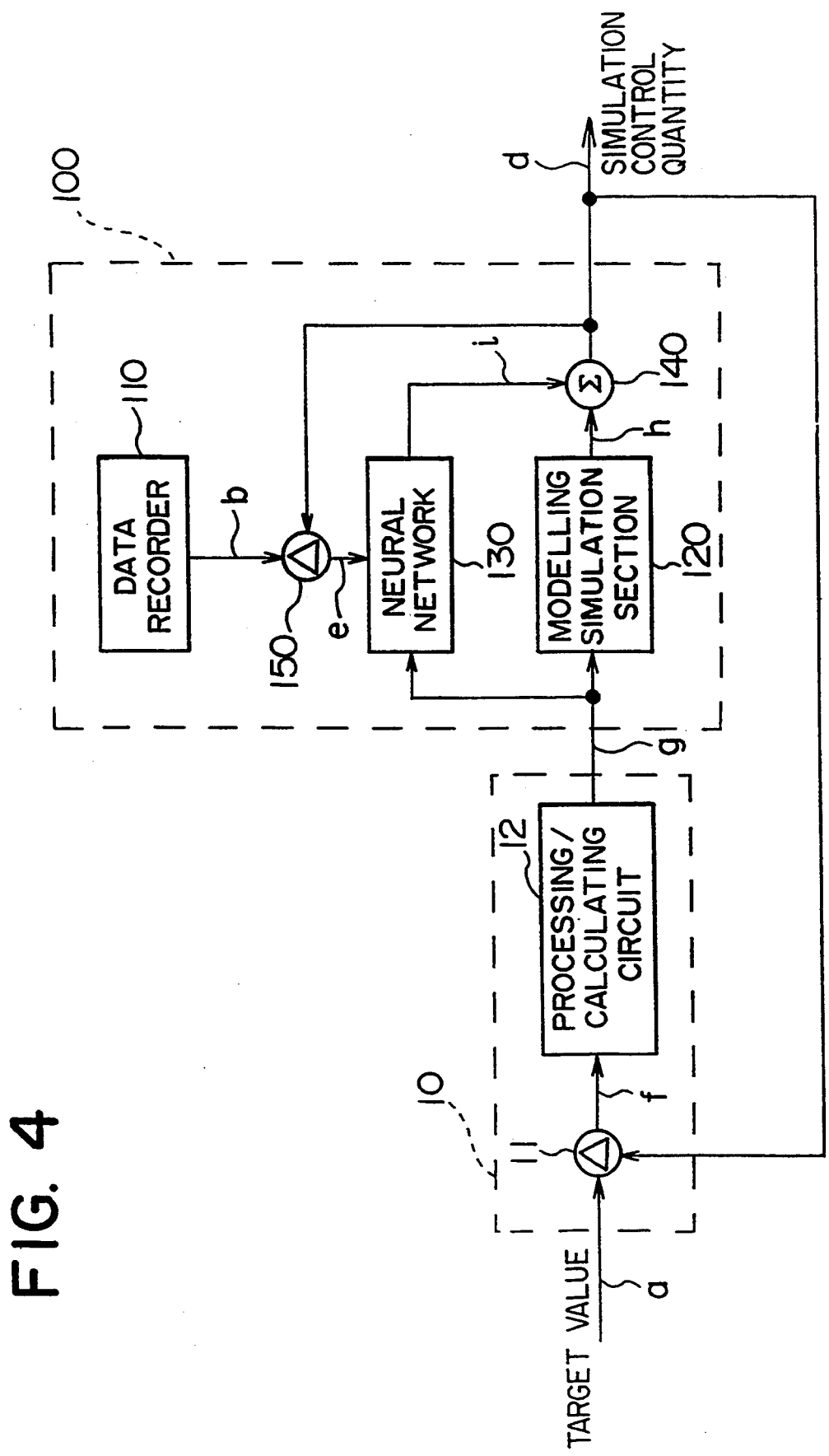
FIG. 4 is a block diagram which schematically shows the structure of a simulator in accordance with an embodiment of the present invention.

FIG. 4 is a block diagram which schematically shows the structure of a simulator in accordance with an embodiment of the present invention. Parts or components that are the same as or similar to those in FIG. 1 are designated by the same reference numerals, and repeated description on them is omitted for simplification. A simulator 100 is constructed of a data recorder 110 in which control quantities of a real machine are recorded, a modelling simulation section 120 having the same structure as the simulator 20 shown in FIG. 2, a neural network 130, an adder 140 and an error calculator 150.

A process quantity signal g output from a processing-/calculating circuit 12 of a controlling unit 10 is input into the modelling simulator section 120 and the neural network 130. An output signal h from the modelling simulation section 120 and an output signal i from the neural network 130 are input into the adder 140 in which they are processed by adding, and thereafter, a simulated control quantity signal d is output from the adder 140. The simulated control quantity signal d is input into the error calculator 150, while it is fed back to the controlling unit 10. The error calculator 150 calculates an error of the simulated control quantity signal d deviating from a control quantity b of a real machine stored in the data recorder 110 and then outputs a learning signal e therefrom. The learning signal e is input into the neural network 130 in which it is used as a signal for executing a back-propagation algorithm to be described later.

Figure 5:
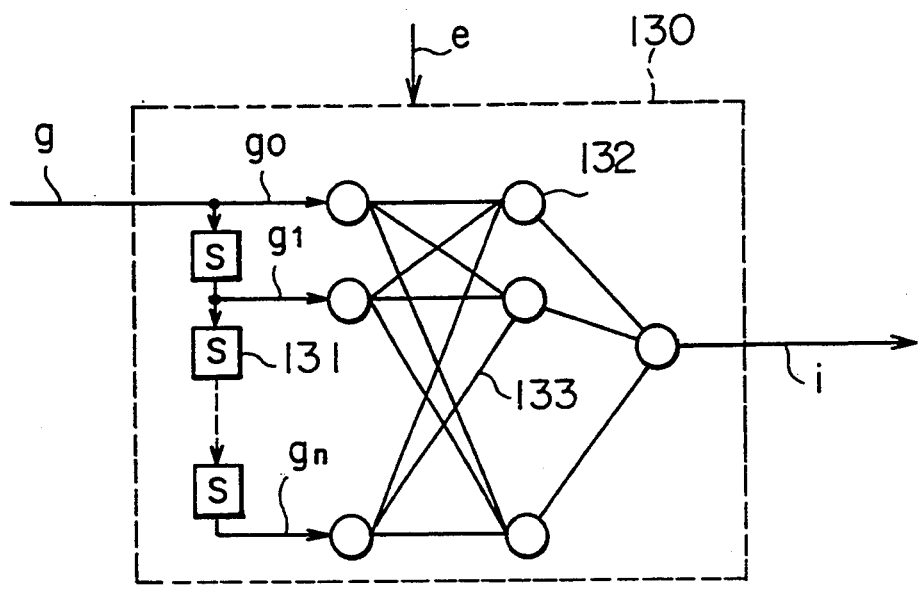
FIG. 5 is an illustrative view which schematically shows the structure of a neural network which can process time series signals.

FIG. 5 is an illustrative view which schematically shows the structure of the neural network 130 in which time series signals can be processed. As shown in the drawing, the neural network 130 is constructed of a plurality of differentiating circuits 131 for sequentially differentiating the process quantity g input thereinto, a plurality of neurons 132 and a plurality of synapse connections 133 by way of which the differentiating circuits 131 and neurons 132 are connected. In the drawings, reference character $g_0$ designates a zero-dimension differentiated value of the processed quantity g (equal to the processed quantity g), reference character $g_1$ designates a one-dimension differentiated value of the same, and reference character $g_n$ designates a n-dimension differentiated value of the same.

Figure 6:
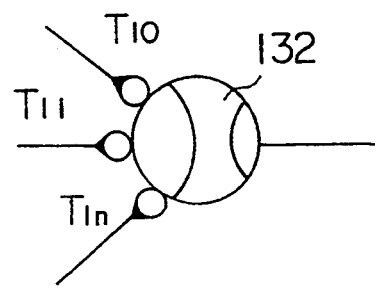
FIG. 6 is an illustrative view which schematically shows the structure of a neuron.

FIG. 6 is an illustrative view which schematically shows the structure of each neuron 132 in the neural network 130. In the drawing, $T_{10}, T_{11}, ---, T_{1n}$ designate respective synapse loads.

An operation of the simulator as shown in FIG. 4, FIG. 5 and FIG. 6 will be described below.

First, when a target value a of the control quantity is input into the controlling unit 10, the controlling unit 10 outputs a process quantity g. This process quantity g is then input into the modelling simulation section 120 and the neural network 130 in the simulator 100. The process quantity g input into the modelling simulation section 120 is processed based on the properties of a modelled object to be controlled, and thereafter, a signal h is output from the modelling simulation section 120. On the other hand, the properties of a real machine are reflected in the neural network 130 by learning the properties of the real machine, as will be described later. The process quantity g is processed in the neural network 130 depending on the properties of the real machine, and thereafter, a signal i is output from the neural network 130. This signal i and the output signal h from the modelling simulation section 120 are added to each other in the adder 140, whereby the properties of the real machine are properly corrected. The thus corrected signal is output in the form of a simulation control quantity d. In addition, this simulation control quantity d is fed back to the controlling unit 10 and, then, the latter controls the process quantity g that is an output signal from the controlling unit 10.

A mode of learning the properties of the real machine in the neural network 130 will be described below.

A control quantity b for the real machine is previously stored in the data recorder 110. The control quantity b for the real machine stored in the data recorder 110 and a simulation control quantity for the same are input into the error calculator 150 during the simulation. A differential signal of the former from the latter is learned as a learning signal e in the error calculator 150 with reference to the control quantity b for the real machine processed in the neural network 130. This learning is achieved in accordance with a back-propagation algorithm or the like. Values of the synapse loads $T_{10}, T_{11}, ---, T_{1n}$ are preset such that an output from the neural network 130 becomes zero during the initial period of learning. The foregoing presetting causes the output generated by the simulation in the modelling simulation section 120 to be output as a simulation control quantity d. An error of the simulation control quantity d deviating from the control quantity b for the real machine is calculated in the error calculator 150 each time learning is performed. Then, this error is input into the neural network 130 in the form of a learning signal e. In response to the learning signal e, the values of the synapse loads $T_{10}, T_{11}, ---, T_{1n}$ of the neurons 132 are updated in the neural network 130. As the learning is repeatedly performed, the values of the synapse loads $T_{10}, T_{11}, ---, T_{1n}$ of the neurons 132 are renewed with the result that the neural network 130 outputs a signal i such that the learning signal e becomes gradually small. After the learning has been repeated so that the learning signal is sufficiently small or learning has been executed a predetermined number of times, the values of the synapse loads $T_{10}, T_{11}, ---, T_{1n}$ are kept fixed.

As learning is repeatedly performed in the neural network 130 using the control quantity of the real machine in the above-described manner, an output h from the modelling simulation section 120 is corrected. Therefore, the output h is derived from the properties of the real machine. Consequently, simulation can be achieved at a higher accuracy.

The object to be controlled is modelled in the modelling simulation section 120 based on the design data. Thus, even though the data on the control quantity b of the real machine stored in the data recorder 110 are not present over the whole control range, uncontinuity in the simulation model does not occur. Thus, simulation can be accomplished over an entire control range.

In the aforementioned embodiment, data on the control quantity of the real machine are previously stored in the data recorder 110 so that learning is performed based on the stored data. Alternatively, data on the control quantity for the real machine may be input into the error calculator 150 on the real time basis for the same purpose.

As is apparent from the above description, the simulator 100 simulates the real machine more accurately by correcting the output from the modelling simulation section 120 in the neural network 130. In addition, since the output from the modelling simulate section 120 is corrected in the neural network 130, this makes it possible to perform simulation even when the data on the control quantity of the real machine are not present over the whole operation range.

Figure 7:
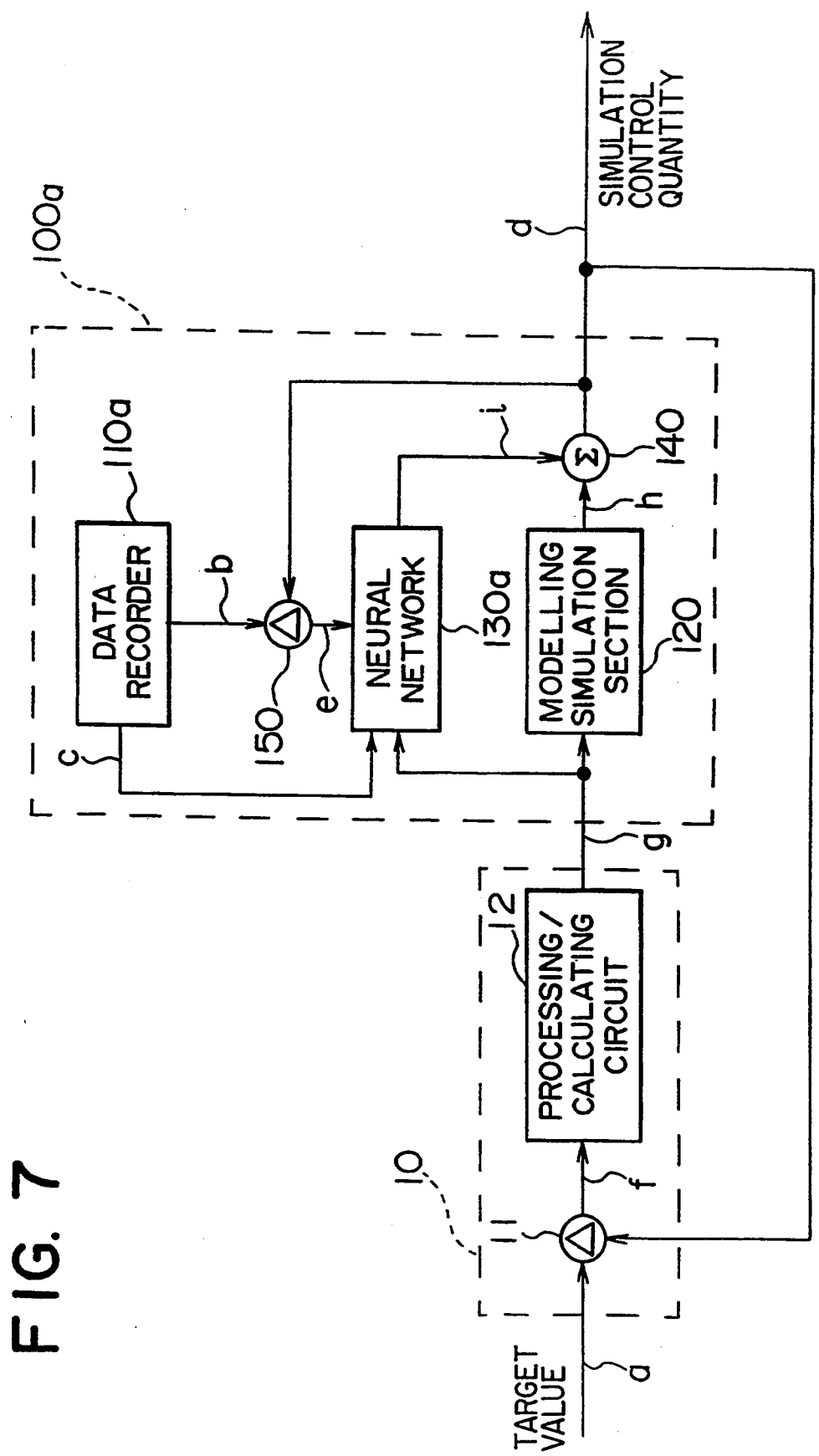
FIG. 7 is a block diagram which schematically shows the structure of a simulator in accordance with another embodiment of the present invention.

FIG. 7 is a block diagram which schematically shows the structure of a simulator in accordance with another embodiment of the present invention.

Same or similar portions to those shown in FIG. 4 are represented by the same reference numerals, and repeated description on them is omitted for simplification.

In this embodiment, a simulator 100a is constructed such that not only a control quantity b for a real machine but also a process quantity c for the same are stored in a data recorder 110a. Thus, a process quantity g output from the controlling unit 10 and the process quantity c for the real machine are input into a neural network 130a having two input terminals. Learning is performed in the neural network 130 based on the control quantity b for the real machine.

Figure 8:
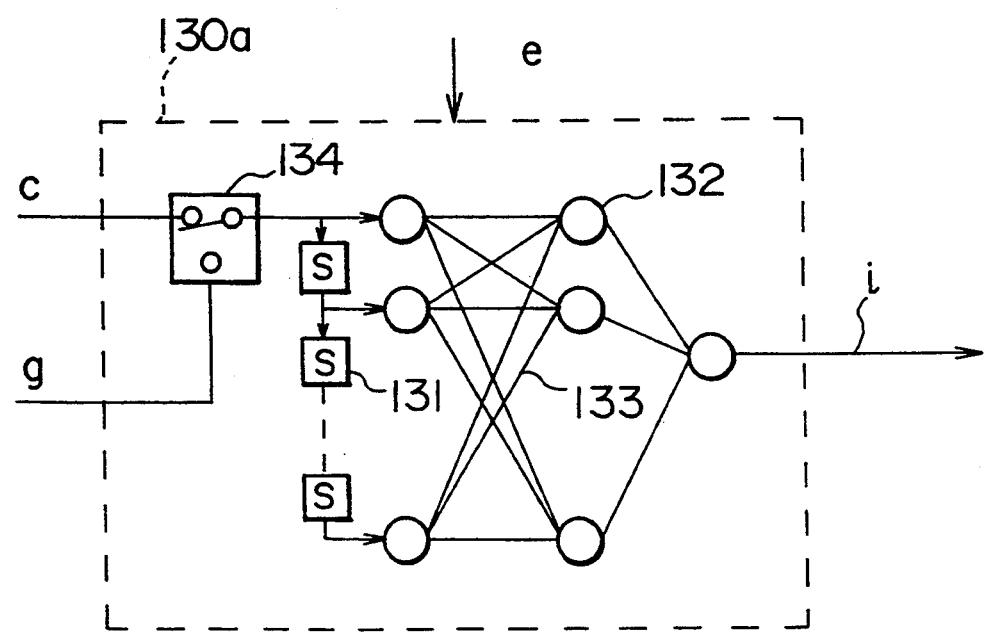
FIG. 8 is an illustrative view which schematically shows the structure of a neural network used for a simulator shown in FIG. 7.

FIG. 8 is an illustrative view which schematically shows the structure of the neural network 130a for the simulator 100a shown in FIG. 7.

As is apparent from FIG. 8, in contrast with the neural network 130a shown in FIG. 5, the neural network 130 is additionally provided with a shift switch 134 for shifting one input signal to other one and vice versa.

In the simulator according to the embodiment shown in FIG. 7, when learning is performed in the neural network 130a, the process quantity c for the real machine is selected by the shift switch 134. Learning is executed in the neural network 130a based on the input process quantity c. After learning is repeatedly executed a predetermined number of times, the process quantity g output from the controlling unit 10 is selected by the shift switch 134 again. Subsequently, learning is executed in the neural network 130a based on the input process quantity g. In this manner, learning can be achieved at a high speed by the neural network 130a.

Figure 9:
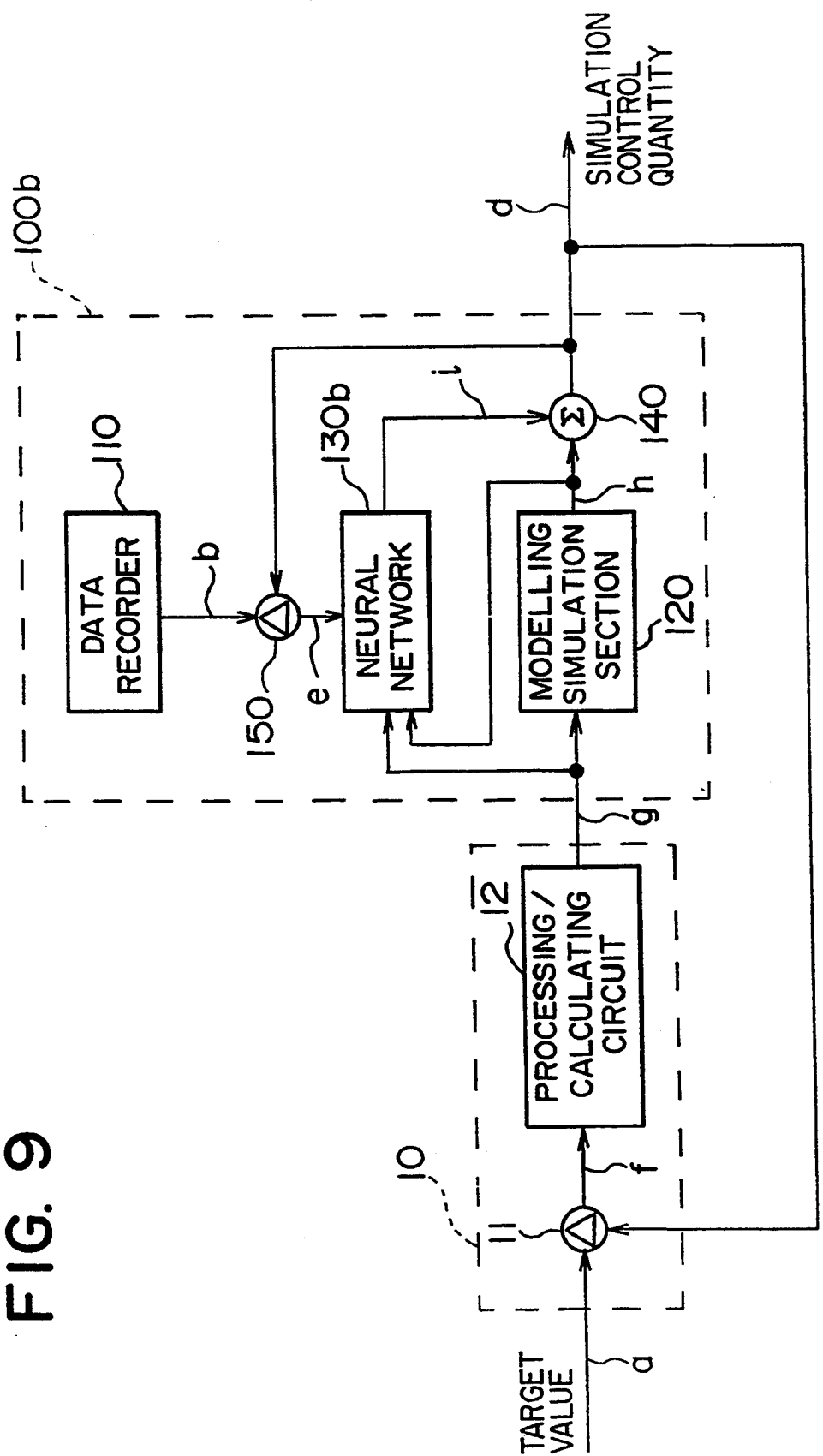
FIG. 9 is a block diagram which schematically shows the structure of a simulator in accordance with another embodiment of the present invention.

FIG. 9 is a block diagram which schematically shows the structure of a simulator in accordance with another embodiment of the present invention. Same parts or components as those shown in FIG. 4 are represented by same reference numerals, and repeated description of them is omitted for simplification.

In a simulator 100b according to this embodiment, not only a process quantity g of the controlling unit 10 but also an output signal h from a modelling simulation section 120 are input into a neural network 130b having two input terminals.

Figure 10:
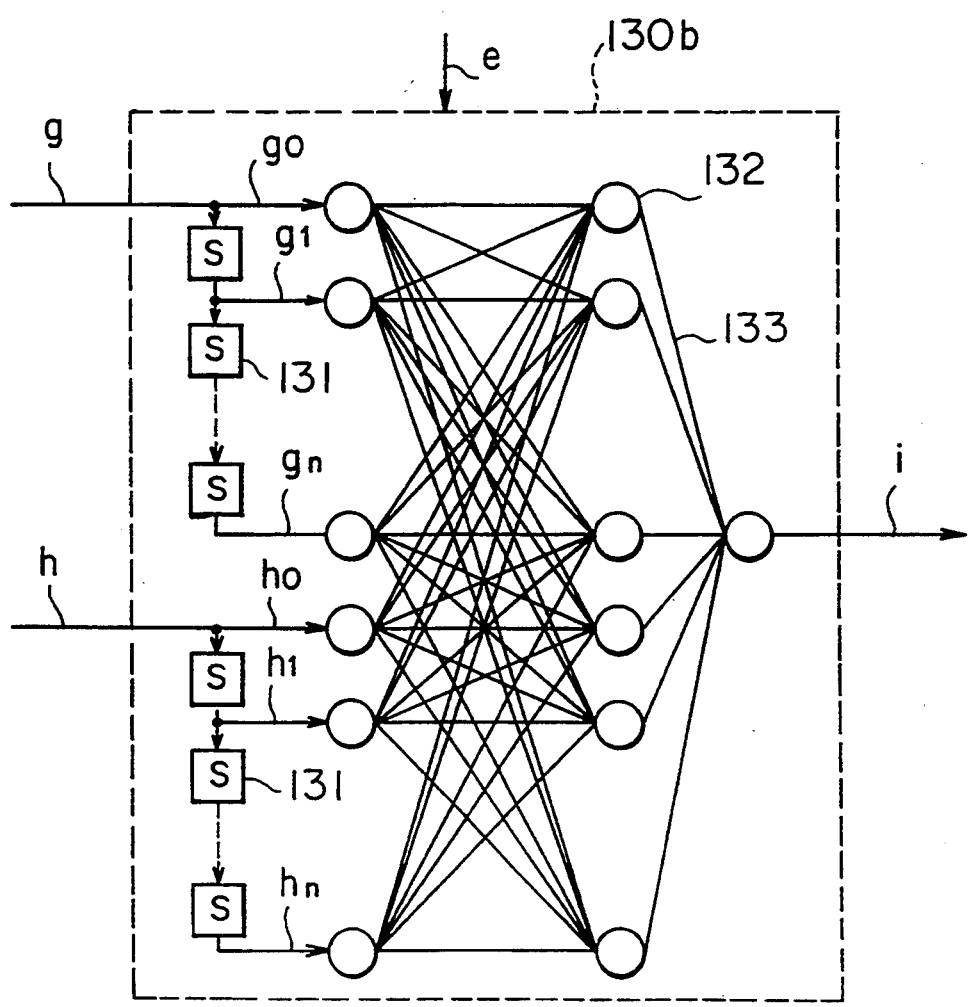
FIG. 10 is an illustrative view which schematically shows the structure of a neural network used for a simulator shown in FIG. 9.

FIG. 10 is an illustrative view which schematically shows the structure of the neural network 130b used for the simulator 100b shown in FIG. 9. Same portions as those constituting the neural network 130 shown in FIG. 5 are represented by the same reference numerals, and repeated description of them is omitted for simplification.

The process quantity g of the controlling unit 10 and the output signal h from the modelling simulate section 120 are input into the neural network 130b. Zero-dimension differentiated through to a n-dimension differentiated values are calculated by a plurality of differentiating circuits 131, and thereafter, the calculated values are input into a plurality of neurons 132. In FIG. 10, reference character $h_0$ designates a zero-dimension differentiated value of the output signal h from the modelling simulation section 120 (corresponding to the output signal h), reference character $h_1$ designates a one-dimension differentiated value of the same, and reference character $h_n$ designates a n-dimension differentiated value of the same.

In this manner, with the simulator 100b shown in FIG. 9, since the neural network 130b operates based on an output from the modelling simulation section 120 in addition to the process quantity g that is an output signal from the controlling unit 10, a learning accuracy and a learning speed can be improved.

Alternatively, the simulator 100b may be provided with a shift switch for shifting the process quantity g that is an input signal from the controlling unit 10 to a process quantity c for the real machine and vice versa as shown in FIG. 7, in order to effect the shifting in that way in the course of learning.

Figure 11:
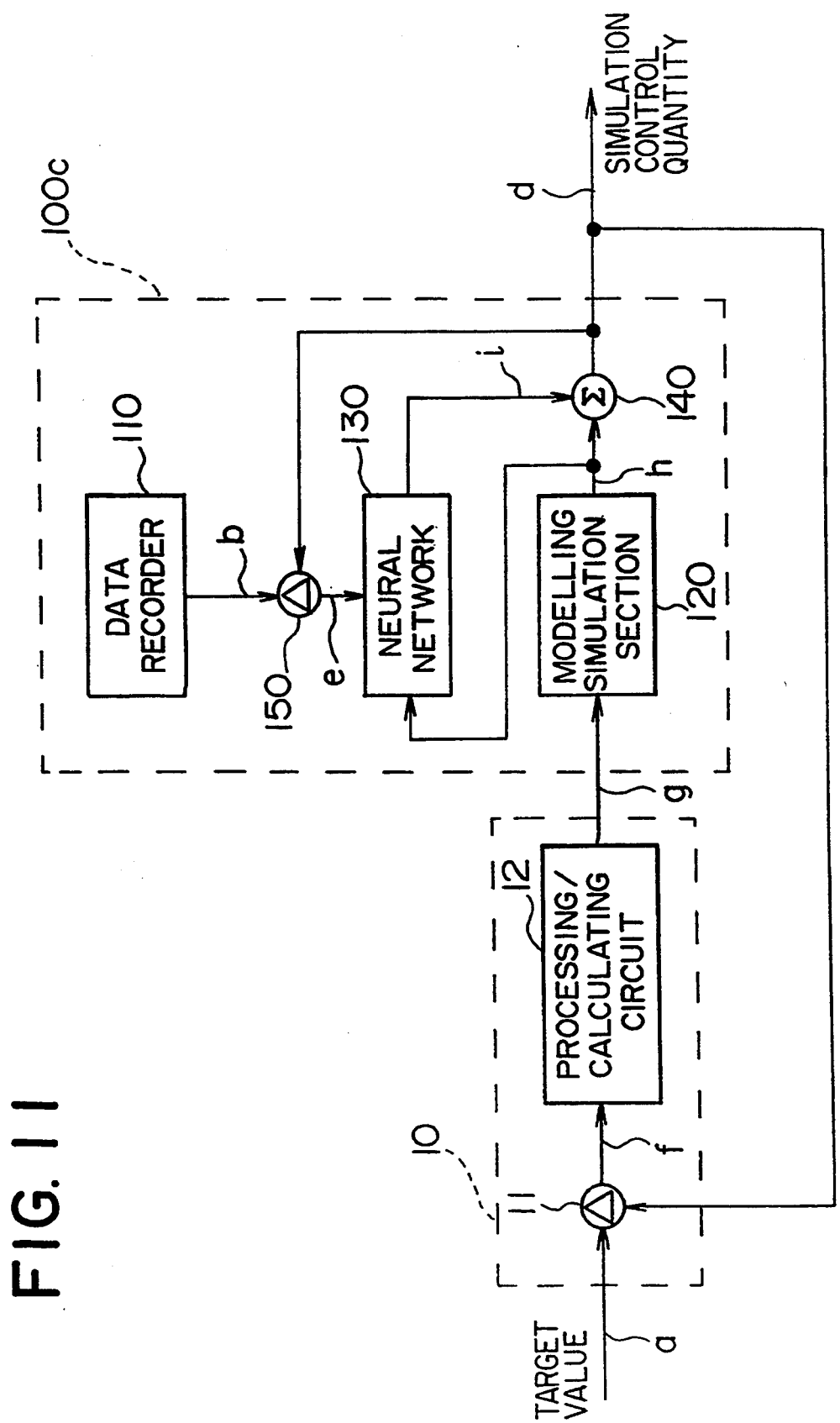
FIG. 11 to FIG. 16 are block diagrams, each of which schematically shows the structure of a simulator in accordance with yet another embodiment of the present invention.

FIG. 11 is a block diagram which schematically shows the structure of a simulator in accordance with yet another embodiment of the present invention. Same or similar portions as those constituting the simulator shown in FIG. 4 are represented by the same reference numerals, and repeated description on them is omitted for simplification.

In a simulator 100c constructed according to this embodiment, a signal to be input into the neural network 130 for the simulator 100 shown in FIG. 4 is not prepared in the form of a process quantity g that is an output signal from the controlling unit 10 but in the form of an output signal h from a modelling simulation section 120.

Figure 12:
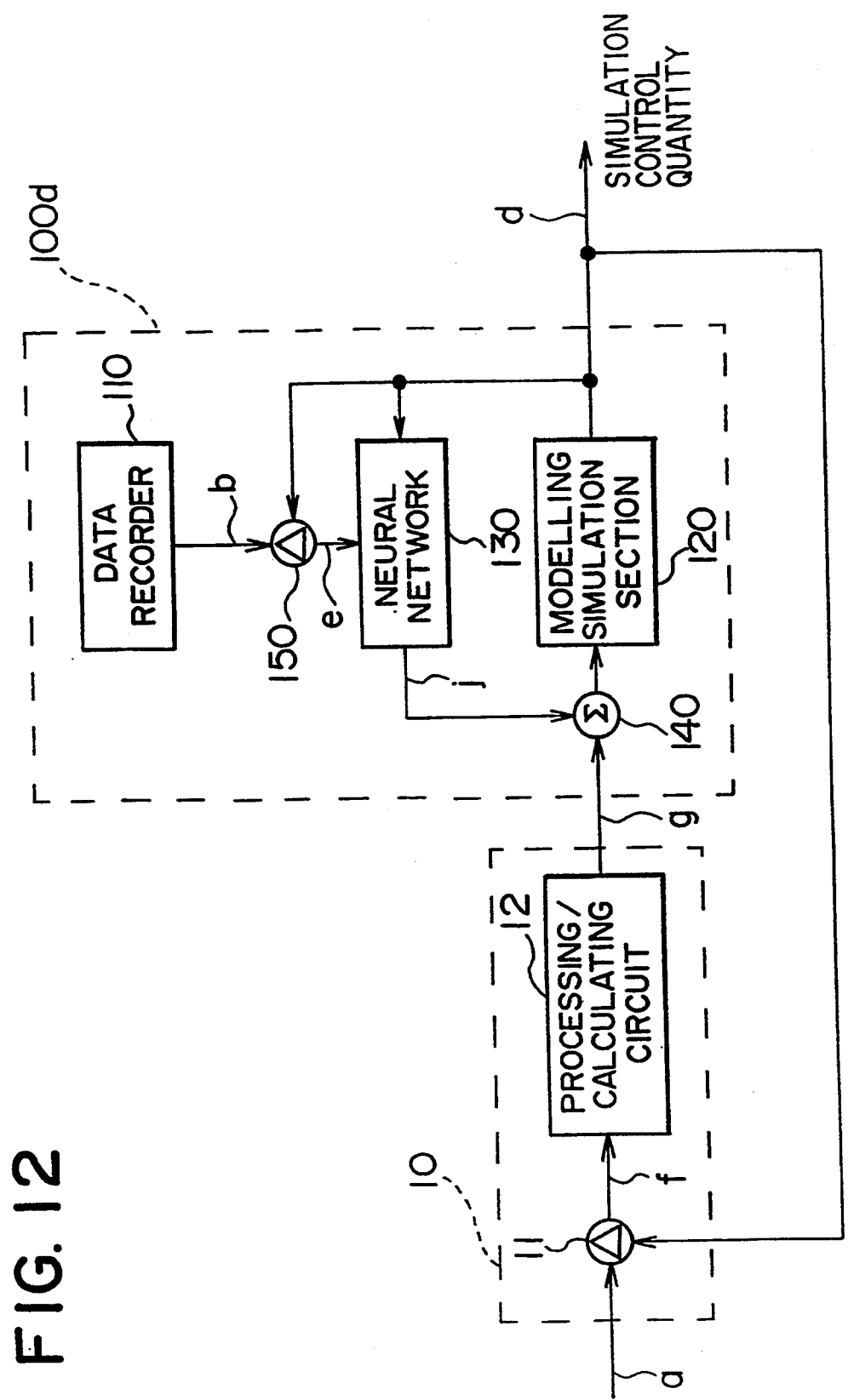

FIG. 12 is a block diagram which schematically shows the structure of a simulator in accordance with further another embodiment of the present invention. Same portions as those shown in FIG. 4 are represented by the same reference numerals, and repeated description on them is omitted for simplification.

In contrast with the simulator 100 constructed in accordance with the embodiment of the present invention as shown in FIG. 4 wherein the adder 140 is disposed on the output side of the modelling simulation section 120, a simulator 100d is provided with an adder 140 on the input side of a modelling simulation section 120. An output from the modelling simulating section 120 is input into an input terminal of a neural network 130. An output signal j from the neural network and a process quantity g that is an output signal from the controlling unit 10 are added to each other in the adder 140, and the result from the addition in the adder 140 is then output to the modelling simulation section 120. In this embodiment, the neutral network 130 carries out feedback control for the modelling simulation section 120. The data stored in a data recorder 110 are data each representing a control quantity for the real machine.

Figure 13:
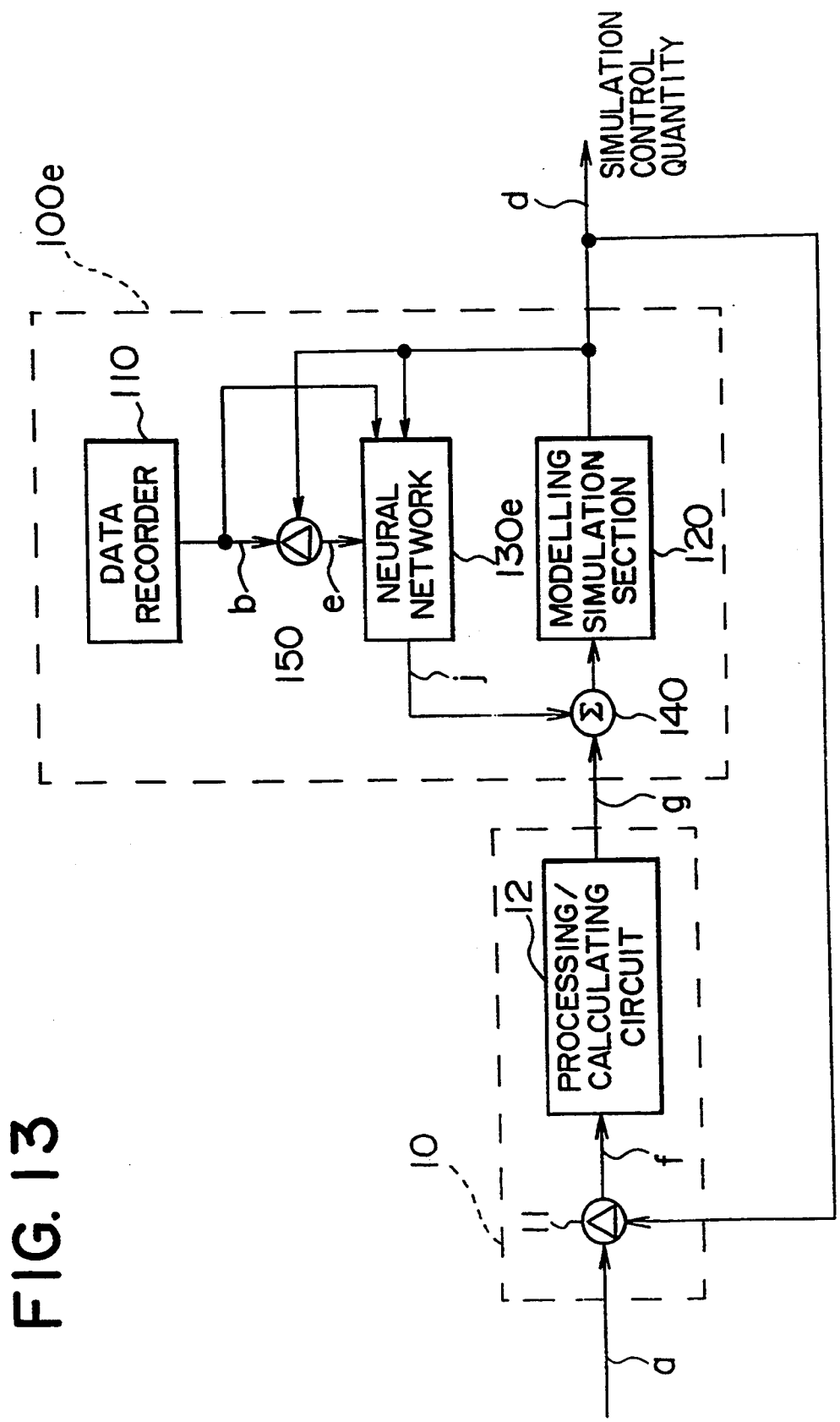

FIG. 13 is a block diagram which schematically shows the structure of a simulator in accordance with yet another embodiment of the present invention. Same portions as those shown in FIG. 12 are represented by the same reference numerals, and repeated description on them is omitted for simplification.

In a simulator 100e constructed in accordance with the described embodiment of the present invention, the neural network 130d in the simulator 100d shown in FIG. 12 is modified to a neural network 130e including two input terminals in the same manner as shown in FIG. 8 so that a control signal b for the real machine is input into one of the two input terminals. When learning is performed in the neural network 130e, the control quantity b for the real machine is selectively used as an input. After learning is repeatedly performed in the neural network 130e a predetermined number of times, an output from the neural network 130e is selectively used as an input for a modelling simulation section 120.

Figure 14:
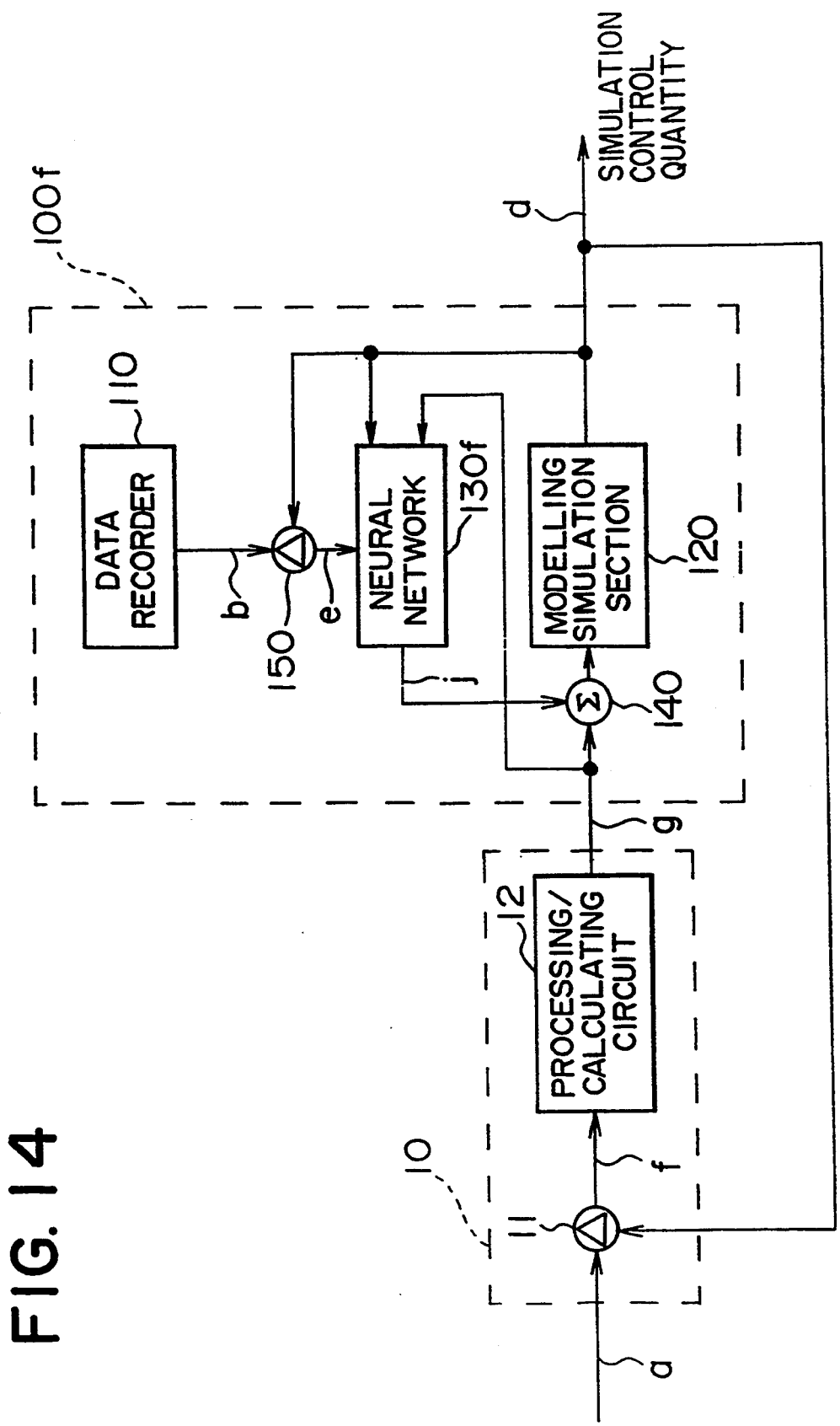

FIG. 14 is a block diagram which schematically shows the structure of a simulator in accordance with yet another embodiment of the present invention. Same portions as those shown in FIG. 12 are represented by the same reference numeral, and repeated description on them is omitted for simplification.

In a simulator 130 constructed in accordance with the embodiment of the present invention, the neural network 130 in the simulator 100d shown in FIG. 12 is modified to a neural network 130f including two input terminals in the same manner as that shown in FIG. 12 so that a process quantity g that is an output signal from the controlling unit 10 is input into one of the two input terminals.

Figure 15:
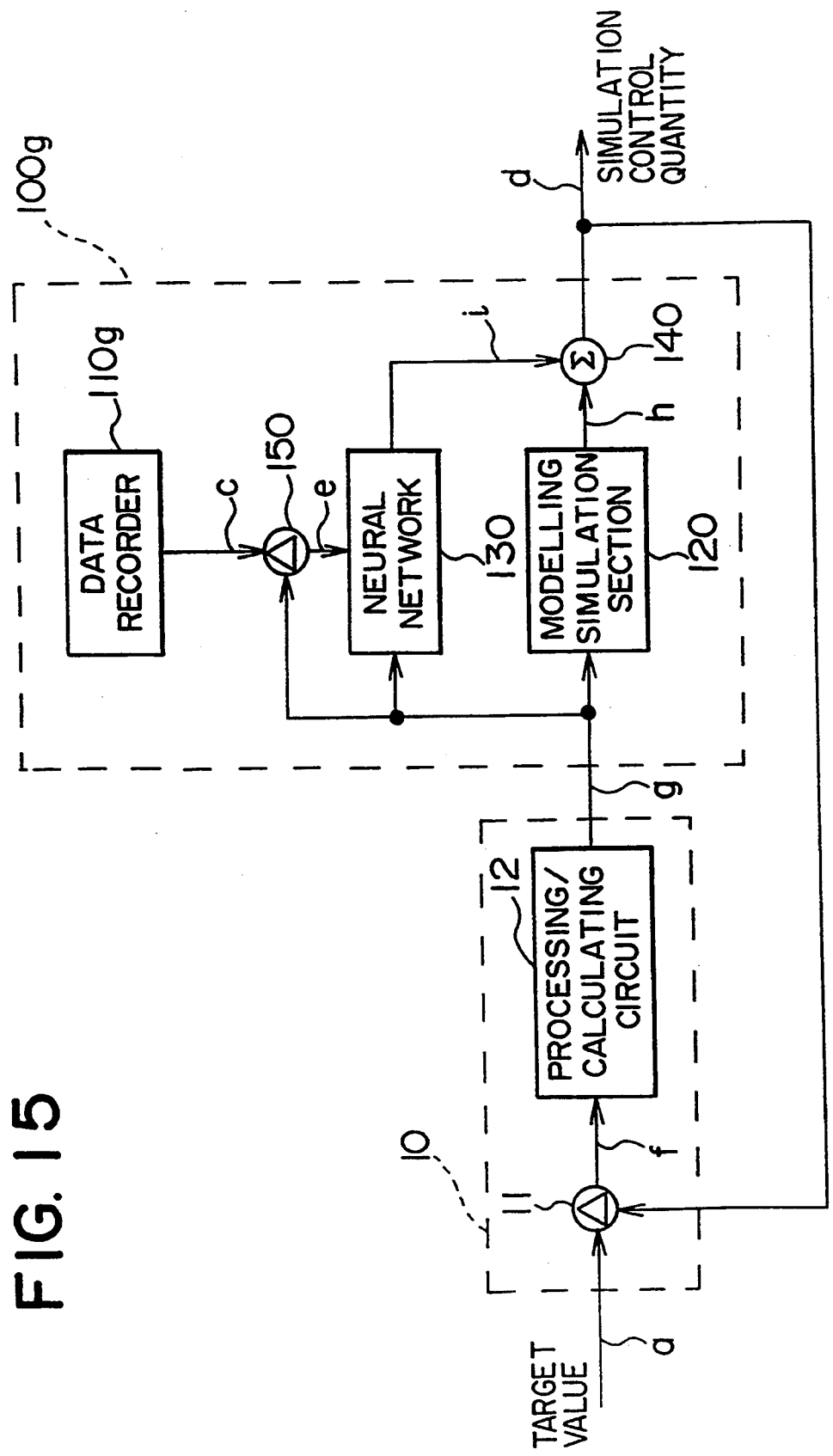

FIG. 15 is a block diagram which schematically shows the structure of a simulator in accordance with yet another embodiment of the present invention. Same portions as those shown in FIG. 4 are represented by the same reference numerals, and repeated description on them is omitted for simplification.

In a simulator 100g constructed in accordance with the embodiment of the present invention, a process quantity c for the real machine is stored in a data recorder 110g. The process quantity c for the real machine and a process quantity g output from the controlling unit 10 are input into an error calculator 150, and the differential signal between the foregoing quantities is input into a neural network 130 as a learning signal e. Specifically, in the simulator constructed according to the embodiment of the present invention, learning is performed in the neural network 130 such that the process quantity g from the control unit 10 is equalized to the process quantity c for the real machine in order to properly correct operations of modelling simulation section 120.

Figure 16:
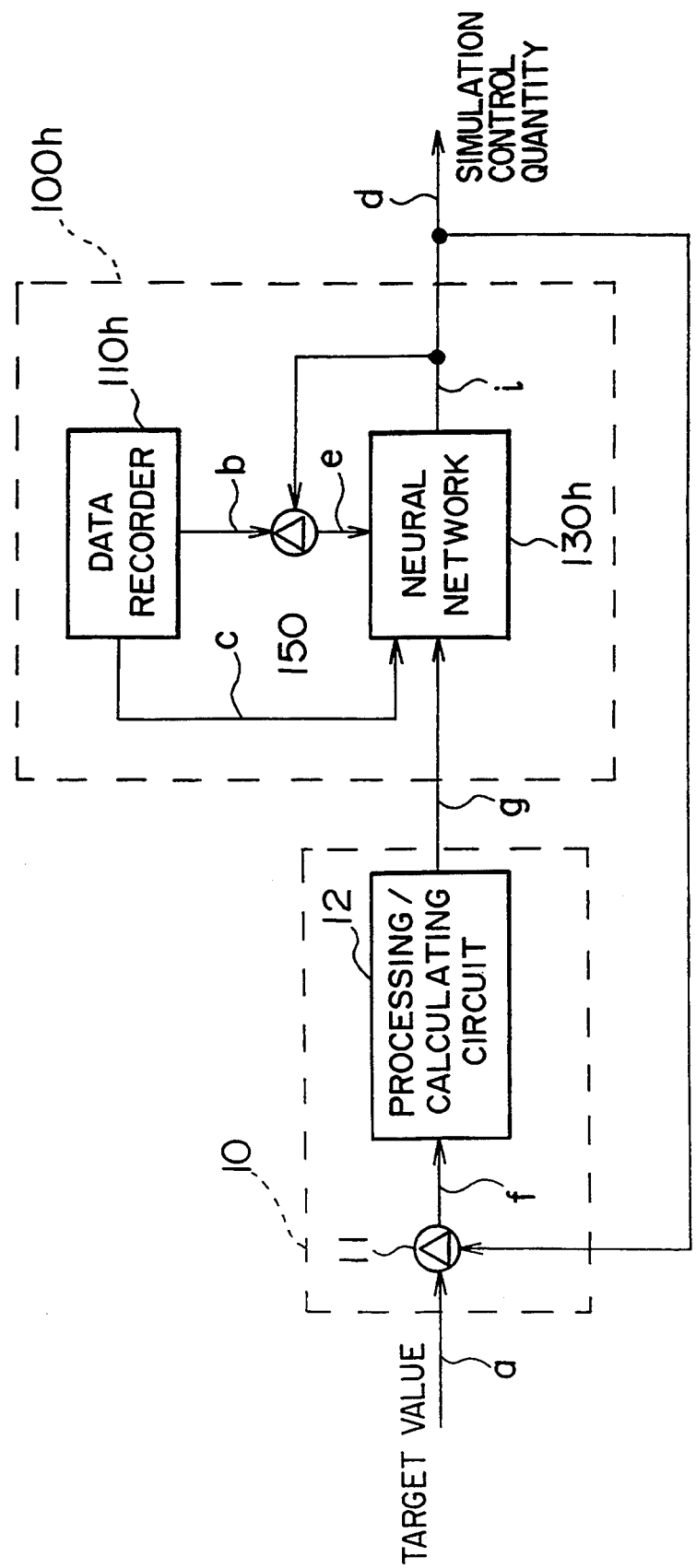

FIG. 16 is a block diagram which schematically shows the structure of a simulator in accordance with further another embodiment of the present invention. Same portions as those constituting the simulator shown in FIG. 4 are represented by the same reference numerals, and repeated description on them is omitted for simplification.

A simulator 100h shown in the drawing is constructed such that the modelling simulation section 120 and the adder 140 shown in FIG. 4 are removed therefrom and simulation is achieved merely by a neural network 130h including two input terminals similar to that shown in FIG. 8. A control quantity b and a process quantity g for the real machine are stored in a data recorder 110h. When learning is performed in a neural network 130h, the process quantity c for the real machine is selectively used as an input signal. After completion of the learning, an output signal i is output from the neural network 130h as a simulation control quantity d. A difference between the control quantity b for the real machine stored in the data recorder 110h and the simulation control quantity d is processed in an error calculator 150. The signal representing the foregoing difference is fed to the neural network 130h as a learning signal e. Learning is performed in the neural network 130h in accordance with a learning algorithm such as a back-propagation algorithm or the like in such a manner as to reduce the learning signal e. In this embodiment, the simulator 100h does not require such a modelling simulation section as the modelling simulation section 120 shown in FIG. 4. Thus, the cost required for constructing the simulator 100h can be reduced, and the modelling simulation section 120 can be eliminated.

Figure 17:
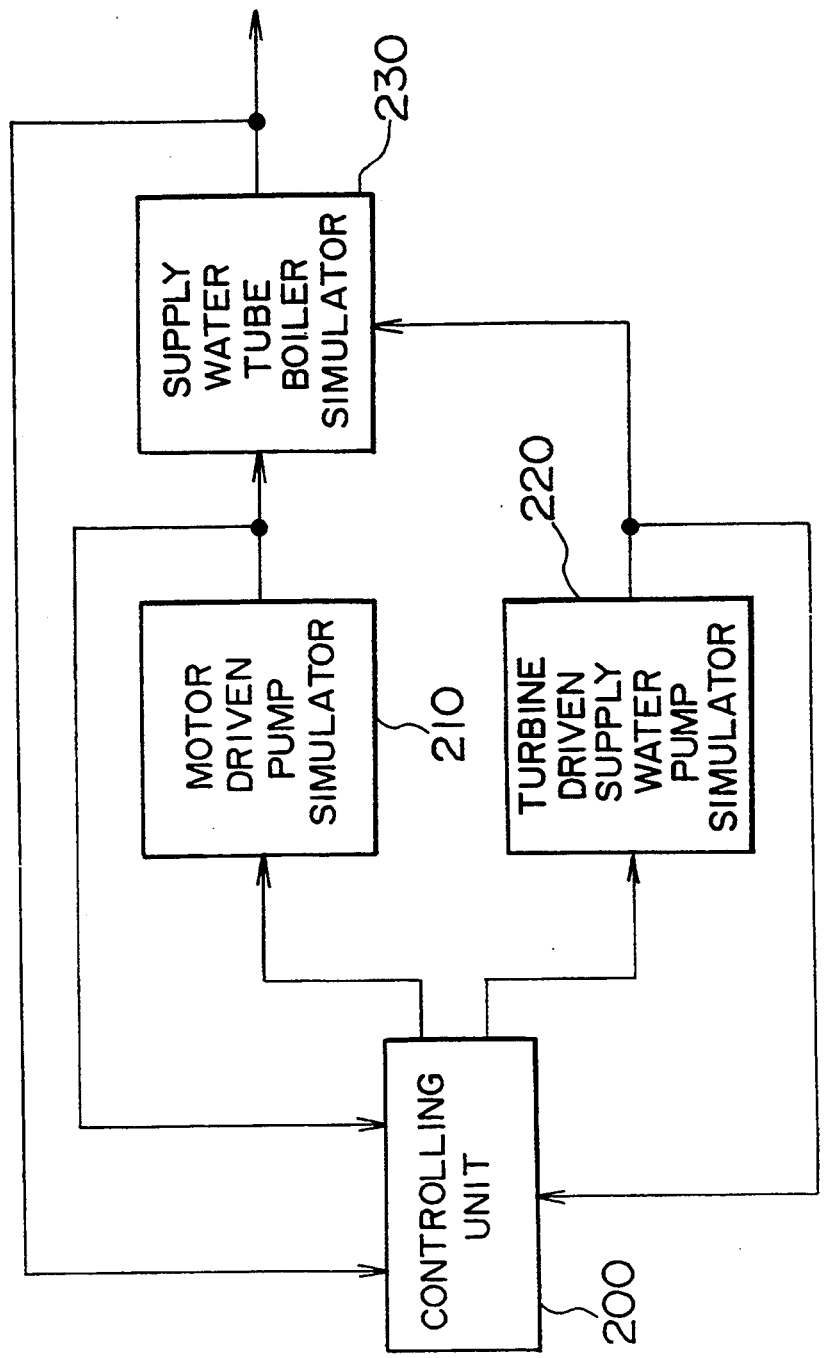
FIG. 17 is a block diagram which shows a simulator system employable for, e.g., a water supply controlling apparatus including a plurality of objects to be controlled.

FIG. 17 is a block diagram which shows a simulator system employable for, e.g., a water supply controlling apparatus including a plurality of objects to be controlled.

This simulator system includes of a motor driven pump simulator 210, a turbine driven water supply pump simulator 220, a water supply tube boiler simulator 230 and a controlling unit 200 for the simulators as mentioned above. It should be noted that each of the motor driven pump simulator 210, the turbine driven pump simulator 220 and the water supply tube boiler simulator 230 is a simulator in accordance with the aforementioned embodiments. In this embodiment, the simulator system includes three simulators. Alternatively, it may include four or more simulators.

In addition, a part of the simulator system may include hardware for training operators using an operation panel. In this case, the remaining part of the simulator system including the controlling unit and the simulators includes a software which operates with the aid of a computer.

Figure 18:
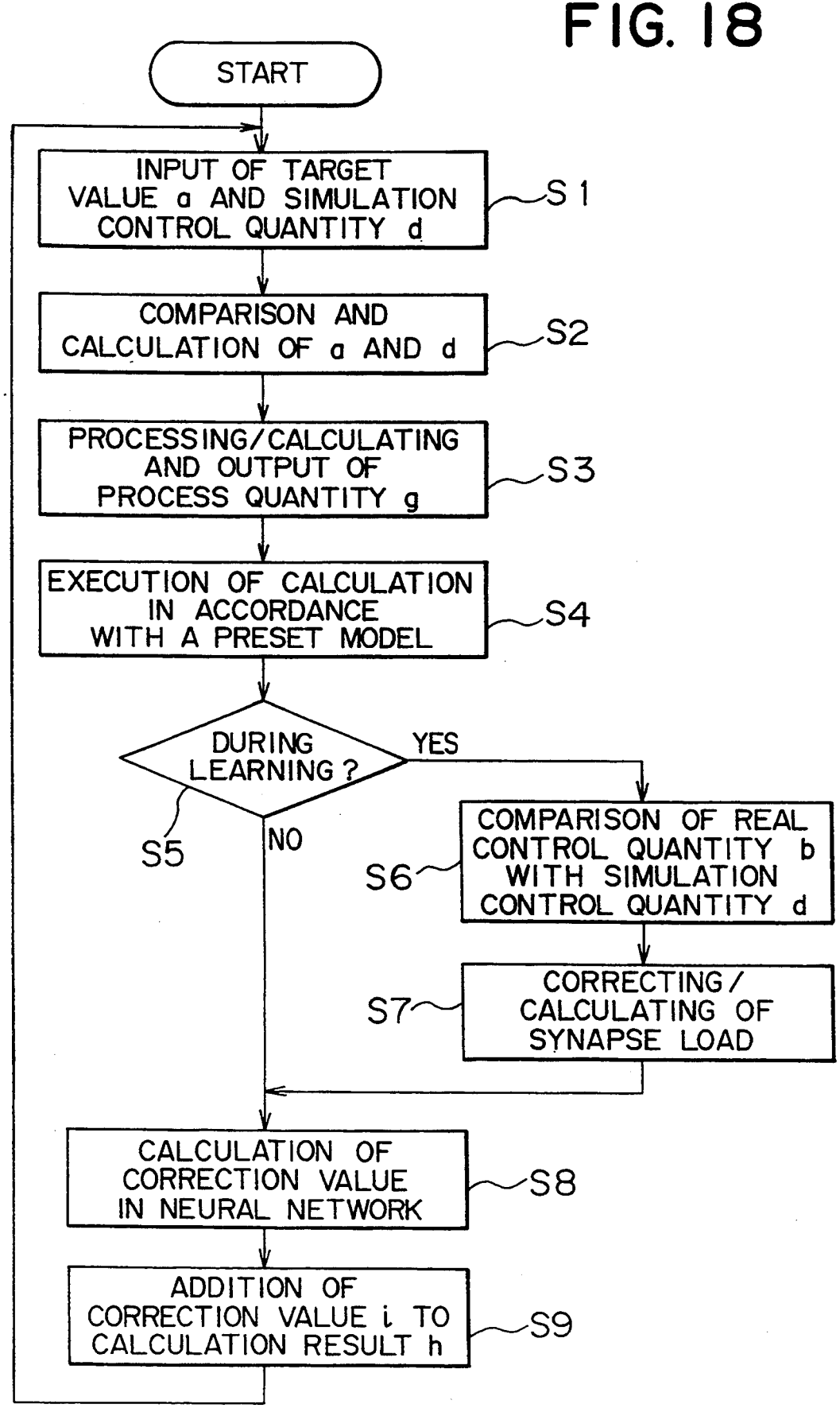
FIG. 18 is a flowchart which schematically shows a series of operations to be performed by the simulator shown in FIG. 4 with the aid of software.

FIG. 18 is a flowchart which shows a series of operations to be performed by the simulator shown in FIG. 4 when the simulator includes software.

First, a target value a and simulation control quantity d are input to the simulator (step S1). Next, the target value a is compared with the simulation control quantity d to calculate a control deviation f (step S2). A process quantity g is determined based on the control deviation f (step S3). Calculation is performed based on the process quantity g in accordance with a model representing preset properties. On completion of the calculation, a result h can be obtained (step S4). In case that learning is effected (step S5), a control quantity b for the real machine is compared with a simulation control quantity d to calculate an error e (step S6). Learning is performed in the neural network 130 in accordance with an algorithm such as a back-propagation algorithm or the like using the foregoing error e (step S7). Subsequently, a correction value i is calculated in the neural network 130 with reference to the process quantity g (step S8), and the correction value i is then added to the calculation result h (step S9). On the other hand, in case that no learning is effected (step S5), the program jumps directly to step S8 at which it is executed again. Subsequently, simulation is repeatedly executed by performing the steps S1 to S9 in the aforementioned manner.

Inputs g, c and h are sequentially differentiated in a plurality of differentiating circuits 131 of the neural network as shown in FIG. 5, FIG. 8 and FIG. 10. Alternatively, delay circuits may be substituted for the differentiating circuits. In addition, the aforementioned inputs may sequentially be sampled in sampling circuits.

As described above, the simulators are able to simulate a real machine more accurately by correcting outputs from the modeling simulation section 120. In addition, since each output from the modelling simulation section is corrected in the neural network, it is possible to accomplish simulation even when data representing the real machine are not present over the whole operation range.

When simulation is performed in the neural network instead of the modelling simulation section, it is possible to accomplish simulation without any necessity for preparing a model.

What is claimed is:

1. A simulator for simulating properties of a predetermined apparatus to be controlled by inputting a process quantity thereinto from a controlling unit for controlling said apparatus, comprising:
   a modeling simulation section for calculating said process quantity based on a property model, in which said properties of said apparatus are preset, and for outputting a first simulation control quantity therefrom;
   a neural network in which learning is performed depending on a real control quantity for said apparatus, said neural network serving to calculate a correction value relative to said first simulation control quantity in said modeling simulation section by inputting said process quantity thereinto; and
   means for adding said correction value to said first simulation control quantity, and for outputting a resultant quantity as a second simulation control quantity.

2. A simulator according to claim 1 further including:
   first storing means for storing said real control quantity for said apparatus on a time series basis; and
   error calculating means for calculating an error of said real control quantity stored in said storing means deviating from said second simulation control quantity and for feeding said error to said neural network as a learning signal.

3. A simulator according to claim 2, wherein a synapse load of each neuron in said neural network is changed in accordance with a back-propagation algorithm in response to said learning signal.

4. A simulator according to claim 2 further including:
   second storing means for storing a real process quantity for said apparatus on a time series basis; and
   selecting means for selecting said real process quantity for said apparatus during an initial period of said learning performed in said neural network and, subsequently, for selecting said process quantity input from said controlling unit.

5. A simulator according to claim 1, wherein said neural network has two input terminals, one of said input terminals receiving said process quantity from said controlling unit and the other input terminal receiving said first simulation control quantity.

6. The simulator of claim 1, wherein the simulator operates in real-time.

7. A simulator for simulating properties of a predetermined apparatus to be controlled by inputting a process quantity thereinto from a controlling unit for controlling said apparatus, comprising:
   a modeling simulation section for calculating said process quantity based on a property model in which said properties of said apparatus are preset and for outputting a first simulation control quantity therefrom;
   a neural network in which learning is performed depending on a real control quantity for said apparatus, said neural network serving to calculate a correction value relative to said first simulation control quantity in said modeling simulation section by inputting said first simulation control quantity thereinto; and
   means for adding said correction value to said first simulation control quantity, and for outputting a resultant quantity as a second simulation control quantity.

8. A simulator according to claim 7, wherein a synapse load of each neuron in said neural network is changed in accordance with a back-propagation algorithm in response to said learning signal.

9. A simulator according to claim 7 further including:
   first storing means for storing said real control quantity for said apparatus on a time series basis; and
   error calculating means for calculating an error of said real control quantity stored in said first storing means deviating from said second simulation control quantity and for feeding said error to said neural network as a learning signal.

10. The simulator of claim 7, wherein the simulator operates in real-time.

11. A simulator for simulating properties of a predetermined apparatus to be controlled by inputting a process quantity thereinto from a controlling unit for controlling said apparatus, comprising:
    adding means including two input terminals, one of said two input terminals receiving said process quantity from said controlling unit and outputting a result derived from addition;
    a modeling simulation section for calculating an output from said adding means based on a property model in which said properties of said apparatus are preset and for outputting a first simulation control quantity therefrom; and
    a neural network in which learning is performed depending on a real control quantity of said apparatus, said neural network serving to calculate a correction value relative to said first simulation control quantity of said modeling simulation section by inputting said first simulation control quantity and then by feeding said correction value into the other one of said input terminals of said adding means.

12. A simulator according to claim 11, wherein said neural network has two input terminals, one of said input terminals receiving said process quantity from said controlling unit and the other of said input terminals receiving said first simulation control quantity.

13. A simulator according to claim 9 further including:
   first storing means for storing said real control quantity of said apparatus on a time series basis; and
   error calculating means for calculating an error of said real control quantity stored in said first storing means deviating from said first simulation control quantity and for feeding said error to said neural network as a learning signal.

14. A simulator according to claim 13 further including:
   second storing means for storing a real process quantity of said apparatus on a time series basis; and
   error calculating means for calculating an error of said real process quantity stored in said second storing means that deviates from said process quantity from said controlling unit and for feeding said error to said neural network as a learning signal.

15. A simulator according to claim 13, wherein a synapse load on each neuron in said neural network is changed in accordance with a back-propagation algorithm in response to said learning signal.

16. A simulator according to claim 11 further including selecting means for selecting said real control quantity during an initial period of said learning in said neural network and, thereafter, for selecting said process quantity from said controlling unit so as to allow said process quantity to be input into said neural network.

17. The simulator of claim 11, wherein the simulator operates in real-time.

18. A simulator for simulating properties of a predetermined apparatus to be controlled by inputting a process quantity thereinto from a controlling unit for controlling said apparatus, comprising:
   first storing means in which a real control quantity for said apparatus to be controlled is stored;
   second storing means in which a real process quantity for said apparatus to be controlled is stored;
   a neural network in which learning is performed depending on said real control quantity for said apparatus to be controlled, said neural network serving to calculate a simulation control quantity by inputting said real process quantity and said control quantity from said controlling unit; and
   error calculating means for calculating an error of said real control quantity deviating from said simulation control quantity and for feeding said error to said neural network as a learning signal.

19. The simulator of claim 18, wherein the simulator operates in real-time.

20. A method of simulating properties of a predetermined apparatus to be controlled by inputting a process quantity from a controlling unit for controlling said apparatus, comprising the steps of:
   outputting a first simulation quantity by calculating said process quantity based on a property model in which properties of said apparatus to be controlled are preset;
   calculating a correction value relative to said first simulation control quantity with respect to said process quantity from said apparatus by using a neural network in which learning is performed depending on a real control quantity for said apparatus to be controlled; and
   outputting a second simulation control quantity that has been corrected by having added thereto said first simulation control quantity with reference to said correction value.

21. A method according to claim 20 further including the steps of:
   calculating an error of said real control quantity deviating from said second simulation control quantity of said apparatus; and
   feeding said error to said neural network as a learning signal.

22. A method according to claim 21 further including a step of changing a synapse load of each neuron in said neural network in accordance with a back-propagation algorithm in response to said learning signal.

23. A method according to claim 22 further including a step of fixing said synapse load after said learning is repeatedly performed a predetermined number of times.

24. The method of claim 20, wherein each of the steps of the method are performed in real-time.

* * * * *

UNITED STATES PATENT AND TRADEMARK OFFICE
CERTIFICATE OF CORRECTION

PATENT NO. : 5,418,710
DATED : May 23, 1995
INVENTOR(S) : Kazuteru ONO et al.

It is certified that error appears in the above-indentified patent and that said Letters Patent is hereby corrected as shown below:

Claim 13, column 11, line 1, "9" should read --11--.

Signed and Sealed this

Fourth Day of June, 1996

Attest:

BRUCE LEHMAN

Attesting Officer        Commissioner of Patents and Trademarks